May 21, 1957

C. D. KEATON ET AL

2,792,594

UNIVERSAL MOLDING MACHINE

Filed Oct. 31, 1951

INVENTORS
Clyde D. Keaton and
Marlin F. Keaton

BY

ATTORNEY

May 21, 1957

C. D. KEATON ET AL 2,792,594

UNIVERSAL MOLDING MACHINE

Filed Oct. 31, 1951

INVENTORS
Clyde D. Keaton and
Marlin F. Keaton

BY

ATTORNEY

May 21, 1957 C. D. KEATON ET AL 2,792,594
UNIVERSAL MOLDING MACHINE
Filed Oct. 31, 1951 7 Sheets-Sheet 7

Fig. 12.

INVENTORS
Clyde D. Keaton and
Marlin F. Keaton
BY
ATTORNEY

United States Patent Office 2,792,594
Patented May 21, 1957

2,792,594

UNIVERSAL MOLDING MACHINE

Clyde D. Keaton and Marlin F. Keaton, Woodstown, N. J., assignors, by mesne assignments, to Plungermatic Corporation, Woodstown, N. J., a corporation of New Jersey Application October 31, 1951, Serial No. 254,046

10 Claims. (Cl. 18—30)

This invention relates to a combination molding press for molding both thermosetting and thermoplastic materials and characterized by completely automatic control of all of the molding operations, as well as by improved automatic cull forming and rejecting mechanism.

The invention also relates to an improved method of molding thermosetting plastics, including tempering the powdered charge, in the molding machine, with predetermined quanta of water vapor, or steam to bring the water content of the charge up to the optimum operating level.

In automatic machine molding of thermosetting and thermoplastic materials considerable difficulty is experienced with the charging of the machines, including the injection of the material into the mold chambers, and with the formation, withdrawal and rejection of sprues or culls. Additionally, great difficulty is experienced with the preparation of the molding powders for injection molding, and the conversion of machines for use with plastics of different molding characteristics.

It has been found that the prior art difficulties, indicated generally above, can be eliminated by the use of a novel injection molding machine having separate preparation equipment for the handling of thermosetting and thermoplastic materials, respectively, selectively coupled to a novel injection molding machine having special cull forming and ejecting equipment, whereby the sprues of the mold piece are removed as a unitary cull, while the mold piece sets or cures in the mold chamber. Additionally, the invention incorporates interlocking controls for the several molding steps, whereby charging of the injection chamber with a fresh molding charge, and the ejection of the cull from the mold piece, are effected while the mold piece sets in the mold chamber, and, following the ejection of the mold piece, the charging, injection, cull-removing, curing and ejection steps take place in automatic sequence. Because of the simultaneous operation of certain of the molding steps, very appreciable time savings are effected in the time cycle. Further savings in time and equipment are effected by the delivery of the mold piece from the mold as a sprue-free item which does not require tumbling or other conventional sprue-removing treatments.

A special feature of novelty of the invention herein resides in the discovery and application of the fact that thermosetting molding powder can be tempered, that is, brought to its optimum moisture content and flash heated in the injection chamber, without causing incipient thermosetting reaction of the molding powder, yet speeding up the final reaction in the mold chamber by virtue of the fact that the preheated individual particles of molding powder are more readily consolidated and fused, under compression, to form a unitary mold piece. When the term flash heating is used herein, it will be understood to connote the moisture tempering of the thermosetting molding powder, as well as true heating. Of particular importance, in connection with the tempering and flash heating of the thermosetting molding powder, is the use of gaseous fluids, such as steam, hot air, and fixed gases generally, which are not reactive with the molding powder. Because the flash heating of powder is conducted at a temperature level below that of incipient thermosetting of the particular material being treated, all danger of freezing of the molding powder in the feeding apparatus and injection chamber, due to mechanical trouble in the feeding and injection equipment, or backing up, due to mold trouble, are positively avoided. Thus a charge of thermosetting molding powder can remain indefinitely in the feeding and injection apparatus, without undergoing any polymerizing reactions and accompanying conversion to a consolidated, irreversible mass, requiring dismantling of the apparatus to effect its removal.

Not only are special and important results secured by incorporating the novel thermosetting equipment in an injection molding machine, but equally desirable and important improvements in operation are effected by the incorporation and use of special thermoplastic feeding equipment with the injection molding machine. The cull remover is specially designed to selectively cooperate with the thermosetting and thermoplastic feeding equipment, serving to vent the flash heating gaseous fluid, in the thermosetting side, and to operate the valve controlling the feed of fused thermoplastic from the feeder to the injection chamber. Because of the special interlocking equipment features, a single universal machine of the type forming the invention herein can be used for any kind of injection molding, and with a pronounced speed-up in the operative cycle time.

Considering the operation of the universal injection molding machine generally, a molding head, injection chamber, and injection ram piston housing, are formed as a straight-line unit, with the mold piece ejector cooperatively associated with the molding head, a special cull remover being transversely disposed across the machine, between the injection chamber and the injection ram piston housing, and normally serving to journal the injection ram in its forward, injection movement. Upon retraction of the injection ram with its attached cull, the cull remover is traversed in its casing to remove and discharge the cull, while simultaneously locking the ram against its forward, injection movement. Movement of the cull ejector into ejecting position actuates the thermoplastic feeder valve, when the thermoplastic side is in operation, and provides a vent for gaseous flash-heating fluid, when the thermosetting side is in operation.

The head or face of the injection ram is slotted, or otherwise formed to provide cull-locking means. The injection nozzle is provided with a plurality of rearwardly flaring orifices, which form conically tapering sprues with their bases consolidated with the keyed mold mass attached to the head of the injection ram to form a unitary cull therewith. This cull is retractile with the injection ram, as the sprues break cleanly at the orifices discharging into the mold chamber. The keyed base of the cull is adapted to be unseated by a key section of the cull remover when the latter is traversed into its cull removing and ejecting position. With the injection ram retracted and the cull removed in cull removing position, the feeder mechanism is operated to feed a charge of molding material into the injector chamber. Where the thermosetting material is used, molding powder is fed into the injection chamber, and is preheated by flash heating with a charge of gaseous heating fluid, the fluid being vented through the cull remover. Where thermoplastic material is used, the molding powder is melted in a jacketed screw feeder, which is driven by an electric motor through a hydraulic variable speed gear, with compensator, such as a wobbler pump. The units of the variable speed gear are interconnected to form a by-pass for the hydraulic transmission fluid, when the pressure backs up in the screw feeder.

With the variable sped gear so by-passed, the screw of the feeder will act as a churn to keep the fused thermoplastic thoroughly mixed and free-flowing.

With the injection chamber charged with molding material, the cull remover is retracted, permitting the injection ram to be advanced to its injection stroke. At the same time, the mold piece, which has been curing or setting while its cull is being removed and a fresh charge of molding material is being introduced into the injection chamber, is ejected from the mold as a sprue-free item, the mold is closed, the fresh molding charge injected therein, and the cycle repeated. The operation, due to interlocking controls, is wholly automatic, and the cycle time is much shorter than when the operation steps are required to be performed sequentially, and not concomitantly, as is the case with the improved apparatus of the present invention.

Because of the special cull-forming and cull-removing equipment, the usual "dwell" or maintenance of the injection ram in its forward injection position for a sufficient time for the mold piece to set in the die is substantially reduced. This desirable result follows from the fact that the orifices of the injector die are of relatively small area, and to the further fact that the sprues and cull are substantially instantaneously chilled and solidified, whereby the injection ram can be retracted upon the completion of its injection stroke, after a relatively short dwell, withdrawing the cull for ejection by the cull remover, and clearing the injection chamber for the reception of a fresh charge of molding material. All of this, without disturbing the normal "dwell" of the mold piece in the die, yet permitting the simultaneous ejection of the cull and the recharging of the injection chamber.

An object of this invention is to provide an improved universal injection molding machine.

Another object of this invention is to provide a universal injection molding machine having improved cull forming and cull removing elements.

Yet another object of this invention is to provide an injection molding machine having improved means for selectively feeding thermosetting and thermoplastic materials.

Still another object of this invention is to provide an improved injection molding machine having special means for preheating the molding material.

It is also an object of this invention to provide an improved method of molding thermosetting plastics, whereby the moisture content of the powdered charge is brought to its optimum operating level, and desirably when the charge of molding powder is introduced into the injection chamber.

A further object of this invention is to provide a fully automatic universal injection molding machine.

The improved universal molding machine of the present invention is also characterized by the following detailed features of novelty and advantage:

(1) The injection ram head and die nozzle cooperate to form a keyed cull which is retractile with the injection ram head;

(2) The novel cull remover at the rear of the injection chamber reciprocates across the injection chamber and has a key adapted to unseat the keyed cull from the injection ram head;

(3) The thermosetting plastic feeder includes a screw-fed hopper for powdered molding material, and means for injecting a tempering charge of water, as a gaseous heating fluid, into the injection chamber with the powdered plastic, with vent means in the cull remover for venting the gaseous fluid;

(4) The thermoplastic feeder includes a gate valve feeding into the injection chamber and a variable speed gear for driving the feed screw, the gate valve being controlled by the movement of the cull remover;

(5) The mold piece in the die sets or cures while the cull is retracted and removed and the injection chamber is recharged with molding material;

(6) When the mold piece is ejected from the mold and the cull remover is returned to normal position, the cycle of operations is repeated;

(7) Interlocking controls are provided for the automatic regulation of operational steps in proper sequence;

(8) The molding cycle time is very substantially reduced.

With the above objects and specific features of novelty and advantage in view, which may be incident to the improvements herein, the invention consists in the parts and combinations to be hereinafter set forth and claimed, with the understanding that the several necessary elements, comprising the invention, may be varied in construction, proportions and arrangements, without departing from the spirit and scope of the appended claims.

In order to make the invention more clearly understood, there is shown in the accompanying drawings means for carrying the same into practical effect, without limiting the improvements in their useful application to the particular constructions, which for the purpose of explanation, have been made the subject of illustration.

In the drawings, like numerals refer to similar parts throughout the several views, of which—

Figure 1:
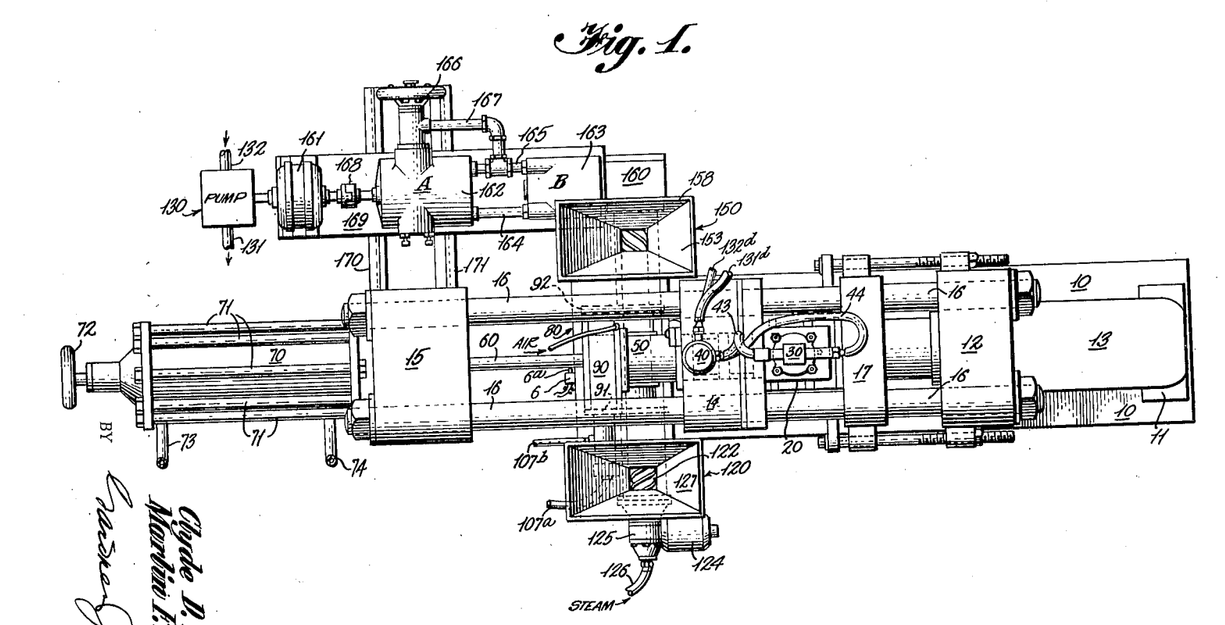
Figure 1 is a plan view of the novel molding machine of the present invention.
Figure 2:
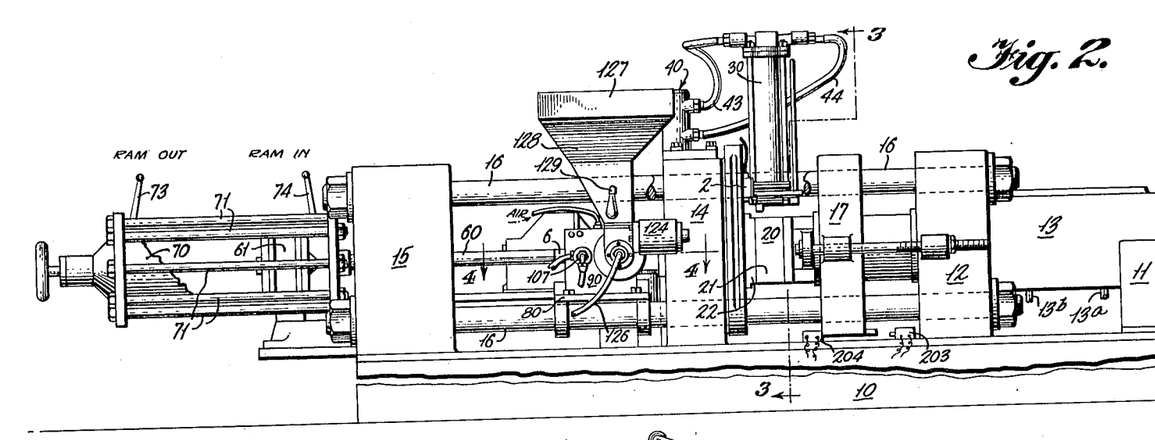
Fig. 2 is a side elevation of the thermosetting plastic feeder side of the machine of Fig. 1.

Turning now to the drawings, and, more particularly, to the showings of Figs. 1 and 2, the novel universal injection molding machine of the present invention will include:

A. Machine base and fixed supports for machine elements;
B. Injection molding machine with the component parts in straight line arrangement, and comprising—
   1. Die supporting and clamping means;
   2. Die assembly and associated ejector mechanism;
   3. Injector cylinder;
   4. Injector ram and actuating piston.

Specially associated with the above standard injection molding machine parts are the following novel structural and operative elements which cooperate with the standard parts to give a wholly novel machine entity characterized by speedier and automatic functioning:

A. Cull former, including, as cooperating elements—
1. Injector die nozzle with rearwardly tapering apertures having constricted discharge orifices to form conical sprues integral with cull formed by
2. Injector ram with specially conformed head;

B. Cull ejector comprising a casing mounted across the rear end of the injector chamber, and housing—
1. Cull remover block or slide with cull-unseating key and actuating means;
2. Aligned apertures journaling injector ram;
3. Cull ejector opening and aligned air blast;
4. Combination journal and cull ejection aperture in cull remover slide;
5. Vent means in cull remover slide;
6. Thermoplastic feeder valve control actuated by cull remover slide;

C. Thermosetting plastic feeder discharging into injector chamber, and incorporating—
1. Screw feed hopper, and
2. Gaseous flash-heating fluid inlet means;

D. Thermoplastic material feeder discharging into injector chamber, and incorporating—
1. Jacket screw feed hopper;
2. Pressure-responsive drive for screw feed;
3. Cull remover-actuated gate valve;

E. Automatic controls.

The conventional injection machine elements, as seen in Figs. 1 and 2, comprise the usual machine base or support 10, mounting standards 11 and 12, which support the die clamping means, with its actuating ram and cylinder, designated generally by the numeral 13. A second pair of supports 14, 15, mount the injector casing and the injection ram-actuating piston, in alignment with the nozzle of die 20, all as will be described more in detail hereinafter. Standards 12, 14, and 15 are mutually braced and supported by bracing rods 16, which serve as guideways for the clamping head 17 of the die clamping assembly 13. It will be noted that member 14 serves as a clamping bed for the injector assembly and the molding die.

Molding die 20 comprises a two-part device with a clamping ram-supported retractile hollow body 21, and a fixed base 22, secured in the front face of support or clamping bed 14. The casing 21 is adapted to hermetically fit over and be clamped on the shouldered recess edges or flanges 23 of base member 22, forming the die or mold chamber therewith. It will be appreciated that the retractile body 21 may be provided with the usual mold elements, including chaplets, metallic inserts, fixed cores, and the like, according to the type and character of mold piece being formed.

The base 22 of the molding die comprises a body portion having an edge-recessed front face and a cylindrical rear portion 24 defining a rear seating flange 25 (Fig. 4) with the body portion. A plurality of aligning pins 26 (Fig. 3) are desirably secured to the face of member 22 for engagement with cooperating apertures in member 21. A plurality of conically tapering apertures terminating in restricted discharge orifices 28 are formed in member 22 and extend therethrough. If desired, a separate nozzle 29, containing the usual discharge orifices, may be fitted in base 22. The member 22 is clamped in and to the discharge end of the injector casing by the die clamping means 13, acting through die body 21.

A mold piece ejector 30 is mounted on the face of clamping bed 14, immediately above the die 20, and its construction and operation will be considered in detail in the discussion of the automatic controls of the machine, as will be the description of its 4-way control valve 40, which is mounted on top of member 14.

The injector assembly comprises an injector casing 50, an injector ram 60, and an injection ram piston cylinder 70.

Figure 8:
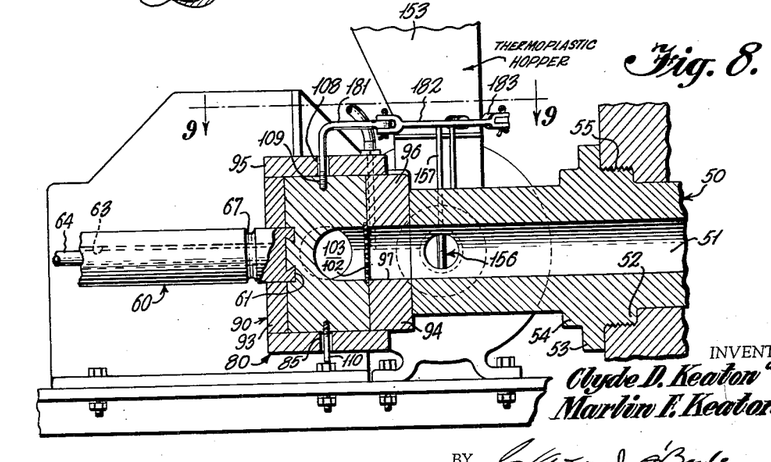
Fig. 8 is a longitudinal section taken on line 8—8 of Fig. 7, showing the locking of the injection ram head by the cull remover block, and showing the linkage connecting the block and the thermoplastic feeder gate valve.

The injector casing 50 is generally cylindrical, with a central axial cylindrical chamber 51 (Fig. 8), receiving and journaling the injection ram 60 for reciprocation therein. The casing is provided with transverse seating elements, centrally of its length, comprising an annular shoulder 52, an annular flange 53, and a second annular shoulder 54, the shoulder 52 being threaded, as shown at 55. A pair of transversely aligned bosses 56, 57 (Fig. 4), are formed at the rear end of the casing, and are connected by a transverse passage 58, in register with and crossing the casing chamber 51. The bosses are internally threaded, as indicated generally by the numeral 59. It will be appreciated that the elements 52, 53, 54, are desirably integral with the casing. The casing 50 is received in a conformed, shouldered opening in clamping bed 14 with the shoulder 52 seated in its recess and the flange 53 having bearing engagement against the rear face of the member 14. If shoulder 53 is screw threaded, the recess in member 14 will be threaded to receive it. The forward end of casing 50 will abut the rear face of die member 22, with the die apertures or passages in free communication with the front end of the injection chamber 51.

Figures 4, 5, 6:
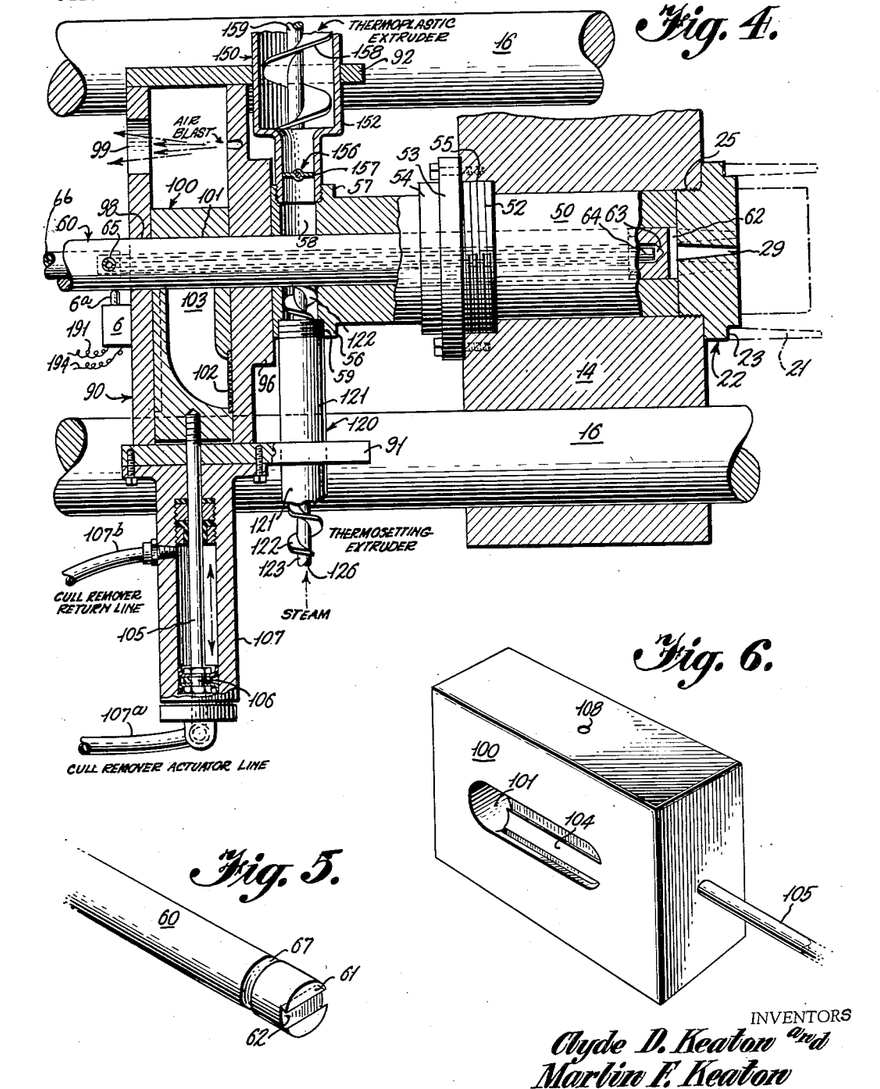
Fig. 4 is a horizontal section taken on line 4—4 of Fig. 2, and showing the details of the cull remover journaling the injection ram in its forward position.
Fig. 5 is a perspective view of the end of the injection ram showing the cull-locking kerf or keyway.
Fig. 6 is a rear perspective of the cull remover block showing the actuating rod, the cull-unseating key, and the journal for the injection ram.

Injection chamber 51 journals the injection plunger or ram 60, in its injection stroke. The ram 60 is reciprocated by piston 61, secured to the rear end thereof. At its front end, the ram is provided with a doubly undercut keyway or kerf 62 (Fig. 5), whose special cull-forming function will be adverted to more in detail hereinafter. An axial passage 63 extends from the front of the ram to a point behind the rear face of the cull remover casing, when the ram is fully advanced, as shown in Fig. 4. A pipe 64 is mounted in the axial passage with its front end free, and its rear end connected to a flexible pipe 65 for the introduction of heating or cooling fluid, as may be desired. The axial passage will be provided with a return pipe 66, as shown. The pipes 65, 66, are connected to a suitable fluid supply, not shown. An annular groove 67 is provided in the forward part of ram 60 for the reception of plunger 6a of safety switch 6 of the plastic charging control circuit. In this position, the injector ram is fully retracted and the switch 6 closed. When the injector ram is moved into injecting position, the plunger 6a is urged out of its seat in groove 67, and rides on the surface of the ram. In this position the switch 6 is open, and the charging control circuit is dead.

The ram piston reciprocates in a cylinder 70 (Fig. 2), which is mounted in the standard 15, and provided with the usual stuffing box, not shown. The cylinder is provided further with a clamping assembly of end rings secured in place by spaced, parallel stay rods, the whole assembly being designated generally by the numeral 71. The travel of the piston is controlled by internal stop members actuated by control 72 (Fig. 1), as shown. The piston cylinder is provided with the necessary actuating fluid lines or inlets 73, 74 which are connected to the automatic controls as will be described more in detail hereinafter. The fluid inlet 73 admits pressure fluid to the rear of the piston, whereby the injection ram 60 is reciprocated to its forward, plastic-injecting position in the injection chamber. The companion inlet 74 admits pressure fluid to the other side of the piston, whereby the injection ram is retracted from the injection chamber to its cull removing position. The controls for the injector ram piston, as well as for all other movable parts of the machine are automatic, and interlocked with time controls which are actuated by the sequential movement of the molding elements.

The injection molding machine, described generally above, is of an accepted, standard type, and has been considered hereinabove in order to furnish the necessary background for a proper evaluation of the novel injection machine elements of the present invention. These novel elements cooperate with the standard, basic elements to provide wholly new combination entities, which are patentably novel, both in and of themselves, as well as in the combination now to be described. Because of the details involved, the novel machine structures will be individually considered, and their cooperative assembly and interaction will be specifically elaborated in connection with the operation of the automatic controls. Likewise, the details of the structure, mounting, and operation of switches, timers, and other control elements, will be confined to the section dealing with automatic controls.

Cull former

Figure 3:
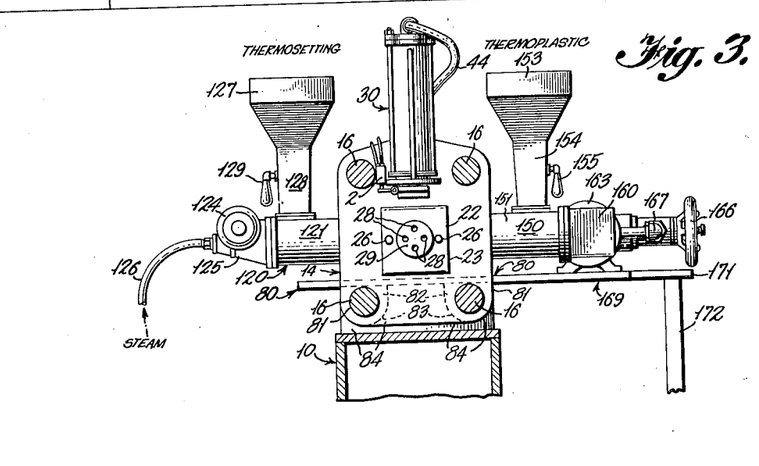
Fig. 3 is a transverse section taken on line 3—3 of Fig. 2, showing the injector nozzle, and the thermosetting and thermoplastic feeding mechanisms.
Figure 7:
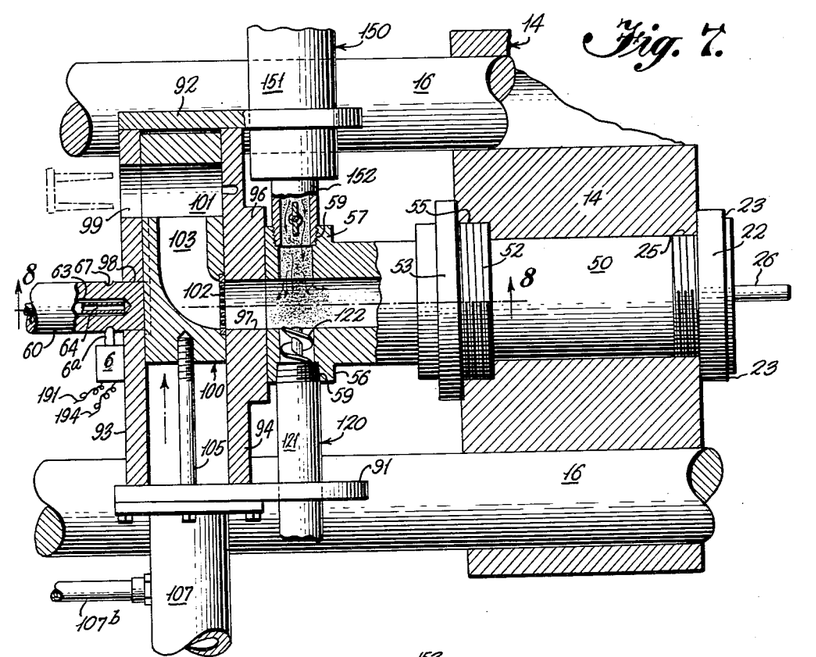
Fig. 7 is a view similar to Fig. 4 showing the cull remover in cull-ejecting position.

A special feature of novelty of the present invention is the formation of sprue-free mold pieces, whereby, when the mold piece has set and cured in the mold, it is ejected in a condition requiring no after-treatment to remove sprues. This desirable condition is attained by providing the injector nozzle with a plurality of conically flaring feeder passages, severally terminating in restricted discharge orifices discharging directly into the mold chamber. Because of the restricted cross-sectional area of each discharge orifice, the several sprues are weakest at the discharge face of the die and are readily detached from the mold piece, even if the latter has attained only a surface chill or set. Thus the formation, withdrawal, and ejection of sprues, are wholly separated from any mold piece after-treatments, in contradistinction to conditions obtaining generally in injection molding practice. The conical feeder passages and discharge orifices 28 of member 22 are fully described hereinabove, and are illustrated in Figs. 3, 4, and 7.

To remove the several sprues, as an entity, from the injector nozzle, wherein they have rapidly solidified, due to their minimum bulk and elongated structure, the invention herein provides means for forming a detachable cull of which the sprues form integral parts. As shown in Figs. 4, 5, 7, and 8, the forward end of injection ram 60 is formed with a doubly undercut keyway or kerf 62. This keying slot being in the face of the injection ram, will be charged with molding material which is integral with that injected through the injection die. The forward end of member 50 and the rear face of nozzle 22 being in apposition, injection chamber 51 communicates directly with the die passages 27, and the plastic material keyed in the face of the injector ram will be integral with the sprues formed in the die apertures. By varying the forward throw or travel of the injection die to accommodate for the use of plastic molding materials of different physical characteristics. Thus, when molding a plastic material having relatively little tensile strength, a maximum spacing between the apposing faces of the ram and die will be maintained in order to give a relatively bulky cull body. When using plastic material of high tensile strength, a minimum spacing will be required to give a cull of reduced body thickness, which has the strength necessary to resist disruption or breaking during its retraction through the injection chamber to the cull ejector.

Cull ejector

The rapid and positive removal of cull pieces and the like from molding machines generally is a desideratum, and, where automatic machines are used, is not only desirable but necessary. With the improvements of the present invention, cull removal is both positive and automatic. This is effected by providing a special cull remover cooperatively associated with the injection ram. The cull remover assembly is mounted on a base or support which is clamped to and across the lower clamping and guide rods of the machine. The details of the cull remover and its structural cooperation with the injector and feeding mechanisms are illustrated in Figs. 4 to 10, inclusive, of the drawings.

A supporting platform 80 (Fig. 3) is mounted on and across the lower set of rods 16 in the following manner: Split clamping rings 81 comprise upper portions 82 and lower, registering semicircular portions 83, secured together by machine screws, or bolts and nuts, all as indicated generally by the numeral 84. The upper halves 82 are fixedly secured to the supporting platform 80, or to certain of its component elements, if the support is a framework structure. With the supporting platform in place on rods 16, the clamping ring elements 83 are clamped in place on the rods 16, by securing members 84, whereby the platform is fixedly secured to the machine.

The platform 80 mounts a cull-remover casing 90, comprising a generally rectangular box structure having a pair of end plates 91, 92, back plate 93, front plate 94, and top or cover 95. The plate 93 is flush with the ends of the end plates, while the plate 94 is spaced from plate 93 and is secured to end plates 91, 92, intermediately of their length, as will be described further hereinafter. The several plates or walls and the cover are secured together in any suitable fashion, as by machine screws, not shown. The front plate has an outer boss 96 which has aligned bearing engagement with the rear end of injector casing 50. This boss and the rear wall are provided with aligned apertures 97, 98, in register with injection chamber 51 of the injector casing. The aligned apertures and the injector chamber serve to journal the injector ram in its forward, injection movement. The plate 93 is provided with a second, horizontally aligned, aperture 99, which is used as a cull ejector outlet.

Mounted for reciprocation in the casing 90 is a cull remover block or slide 100. This member is generally rectangular and conforms to the interior of the casing. The slide 100 is movable from a retracted position to an advanced position, and registers with opening 99 when in its advanced position. The front face of the slide is provided with a screened aperture 102, which registers with chamber 51 through opening 97 when the slide is in its advanced, cull-ejecting position. Openings 101 and 102 are connected by longitudinal passage 103, as shown. Aperture 102 permits the venting of gaseous fluid from the injection chamber when thermosetting molding powder is flash heated by steam or other heating fluid. The rear face of the slide 100 is provided with an undercut key 104 which is adapted slidably to engage keyway 62 of injection ram 60 in its retracted position, and unseat the cull keyed therein when the slide is advanced to cull removing and ejecting position. The slide is reciprocated by piston rod 105 of piston 106 which is mounted in cylinder 107 secured to end plate 91 by machine screws 93, as shown. The piston is reciprocated by fluid introdduced into the piston chamber through lines 107a and 107b, as will be described more in detail when considering the automatic controls. A longitudinal slot 108 formed in the cover 95 of the ejector casing permits the securing of an actuating lever in threaded engagement with the slide, as shown at 109. This permits the actuation of the thermoplastic feeder valve by the cull remover mechanism. A second longitudinal slot 85, in the platform or base plate 80, of the cull ejector casing 90, permits the reciprocation of an actuating dog or lever 110 (Fig. 12), which is fixedly mounted in the bottom of the cull remover block 100. The number 110 is of sufficient length to extend through and beyond the plate 80, and engage an overriding switch 111, which controls the admission of water to the flash boiler used to furnish steam for the thermosetting plastic cycle, as will be described more in detail hereinafter.

As indicated hereinabove, a critical feature in the handling of thermosetting plastic materials is the maintenance of an optimum moisture content in a given charge. Thermosetting plastic materials are usually supplied to the molder as powders, or made up into pellets, or the like, containing a predetermined quantity. Thermosetting plastics generally, in contradistinction to thermoplastic materials, require a certain moisture content in order to be properly processed in the molding machines. As made, these materials usually possess the desired moisture content. However, where the material is shipped any great distance, or is placed in storage, the moisture content diminishes and the material will not flow and mold properly. Thermosetting plastics vary considerably in chemical constitution, and with these variations are accompanying differences in physical and chemical characteristics. Thus, because of these chemical differences, the optimum moisture content of thermosetting plastics of different types may vary so widely that special care must be taken to insure the optimum molding conditions, including the adjustment of the critical moisture content of any given material which is being molded.

In the improvements of the present invention, the optimum moisture content of a material which is being processed is assured by the special apparatus and process steps about to be described: Before beginning the molding of a given batch of material, the operator determines the moisture content of the molding powder or preforms to find out the required addition of moisture for each charge. This amount of moisture is automatically delivered to a flash boiler, and at the appropriate stage of the process is introduced, as steam, into the injection chamber after the powdered charge has been placed therein. The steam thoroughly permeates the charge of powdered material, intimately mixing with the particles, heating the separate particles while depositing a film of moisture thereon, and the excess steam is vented to the atmosphere.

The particular equipment used may comprise a flash boiler, and solenoid valve-controlled water supply feeding the boiler through a needle valve opening. The steam is passed to the injection chamber through a second line controlled by a separate solenoid valve. In the charging timer circuit controlling the auger motor and cull remover valve, shunt connections are made to the solenoids. The water supply control valve has its circuit actuated by a rocker arm switch having an adjustable lever arm engaged by a dog or cam mounted on the underside of the cull remover block. The steam discharge valve has its solenoid directly connected across the charging timer shunt circuit. When the cull remover block is returned to its injection ram-journaling position, it momentarily trips the rocker arm switch, thereby opening the water supply line to inject a predetermined charge of water into the flash boiler. When the switch is tripped, the valve is shut off. While the charge of water is being injected into the boiler, the steam discharge line is closed and remains closed until the charging timer cuts out the auger motor after the charge of powdered plastics has been introduced into the injection chamber. This cutting off of the circuit opens the boiler discharge valve and steam is injected into the injection chamber. While steam is a preferred tempering agent, particularly in cases where moisture content of the charge must be brought up to its optimum, hot air or other neutral gas may be used when the molding powder already contains its optimum moisture content. To this end, a separate air line may be tapped into the flash boiler, the water supply cut off, and the solenoid valve control switched to the air line.

*Thermosetting plastic feeder*

The universal injection molding machine of the present invention is specially adapted for the injection molding of thermosetting plastic materials. By the improvements, herein, including the treatment of molding powder in the injection chamber with gaseous heating fluid, the molding cycle is greatly speeded up.

The thermosetting plastic molding powder feeder, designated generally by the numeral 120, comprises a cylindrical casing 121 mounted in end plate 91 of the cull remover casing. At its forward end, member 121 is in screw-threaded engagement with threads 59 of boss 56 of the injector casing 50. An extruder screw 122 having a hollow shaft 123 is driven by motor 124 through gear box 125. The hollow shaft extends through the gear box and is suitably coupled to line 126 which supplies controlled amounts of steam, hot air, or other gaseous heating fluid. A hopper 127 is mounted on feed pipe 128, which, in turn, is secured in place on and over the rear end of casing 121, in free communication with the screw feeder therein. A suitable valve 129 is provided in pipe 128 to regulate and control the flow of powdered molding material from the feed hopper into the extruder. The motor 124 is connected through a timer control whereby measured amounts of powder will be delivered to the injection chamber by the screw 122. The hollow shaft 123 extends into boss 56 of the injector casing, but not into the injection chamber 51, to permit the necessary clearance for the reciprocating injection ram 60.

As previously noted, the hollow shaft may be apertured to permit mixing of steam or other gaseous heating fluid with the molding powder charge as it is moved from the feed end of the casing 121 to be discharged into injection chamber 51. Desirably, the hollow shaft is not provided with radial apertures, and the charge of steam or other gaseous heating fluid is introduced into the injection chamber after the charge of molding powder, preheating the individual particles thereof, and is vented to the atmosphere through screened outlet 102 of the cull remover slide 100.

Figure 11:
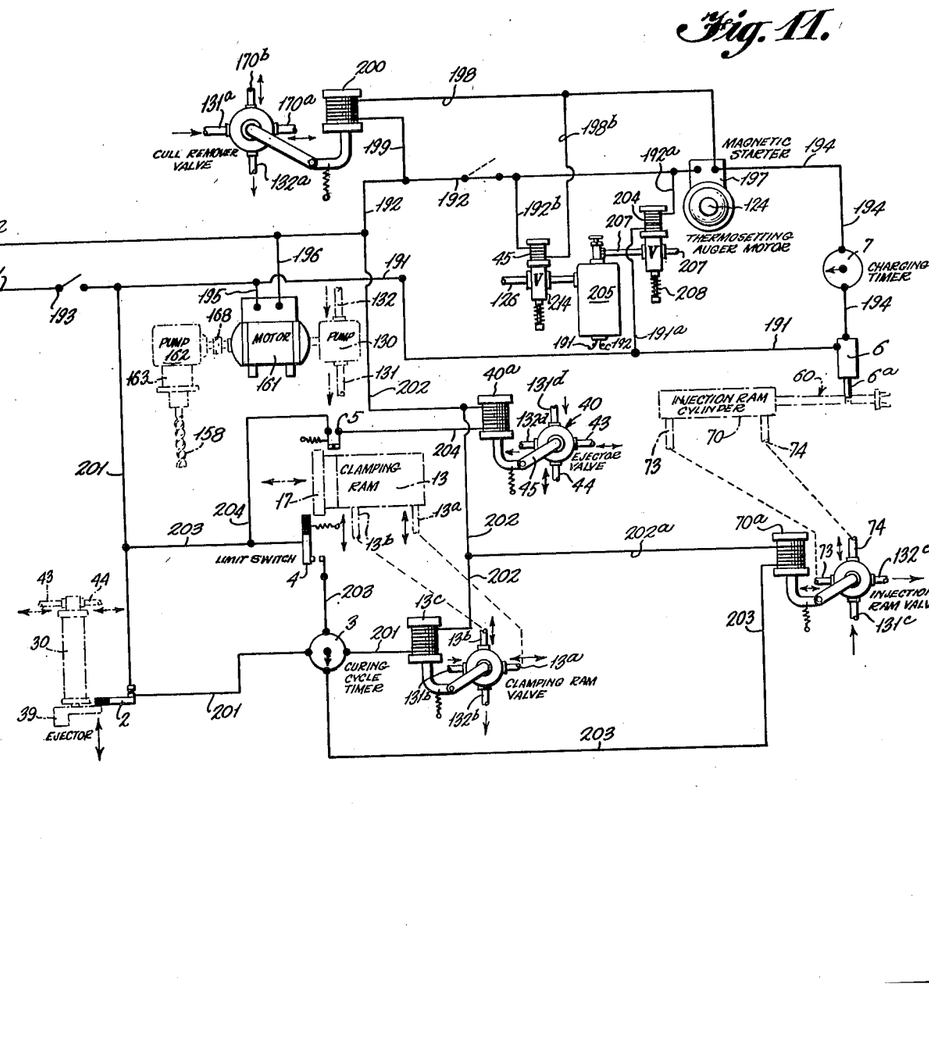
Fig. 11 is a schematic view of the automatic controls of the operating mechanisms.
Figure 12:
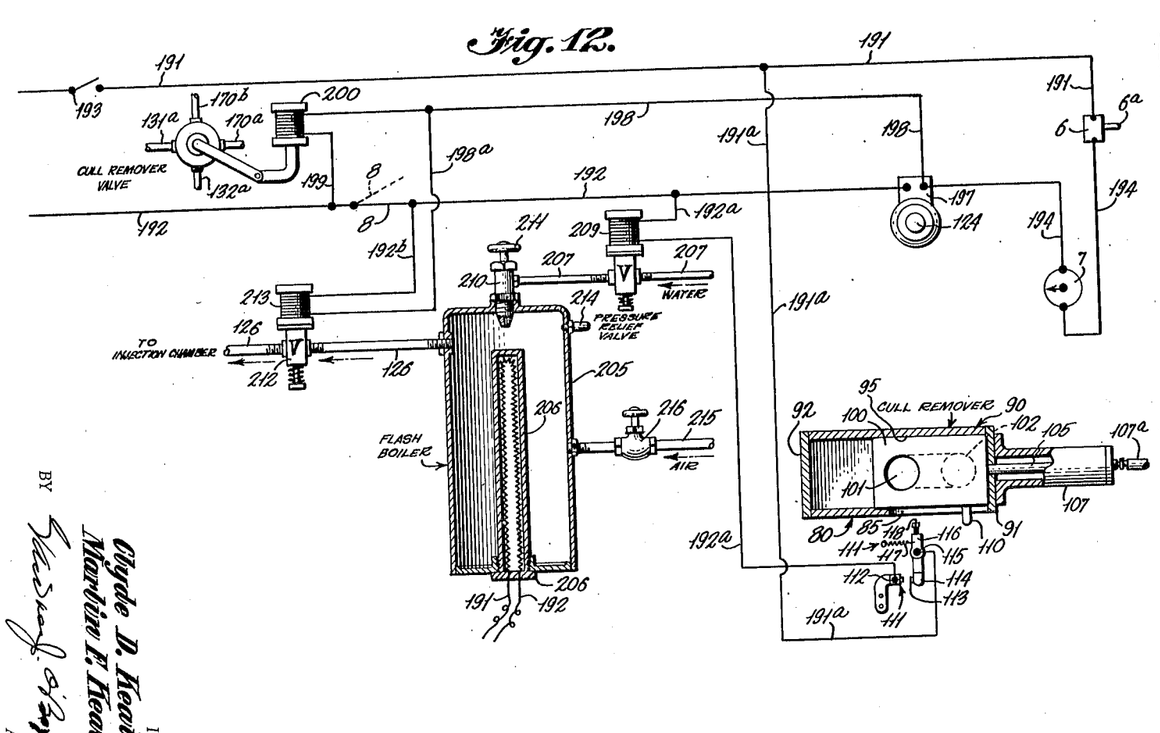
Fig. 12 is a schematic view of a mechanism for the introduction of predetermined quantities of water vapor into the injection chamber when powdered thermosetting plastics are being processed, together with the control circuit therefor.

Referring now to Fig. 12 there is shown one form of steam generator adapted to supply steam or hot air to the injection chamber when a charge of powdered thermosetting material is introduced into the injection chamber. Additionally, the several automatic electric controls for this device are shown in detail, the controls being shown generally, also, in Fig. 11.

In the preferred form shown (Fig. 12), a flash boiler 205 is provided with internal heating means, such as an electrically heated cartridge 206, suitably connected to main current leads 191, 192, and provided with a cut-out switch, not shown. The boiler is provided with water through line 207, which is normally closed by spring-biased valve 208. This valve is actuated to open position by solenoid 209 when overriding switch 111 is closed. The solenoid 209 and its controlling switch 111 are cut in across the main current lines 191, 192 by leads 191a and 192a, respectively. The water supply line 207 discharges into flash boiler 205 through needle valve 210, which is provided with a hand adjusting control 211. The steam discharge line 126 to the injection chamber is normally closed by spring-biased valve 212. This valve is actuated to open position when its controlling solenoid 213 is energized by current supplied through leads 192b, 198a. These leads are in a parallel shunt circuit with the auger motor 124, and are simultaneously controlled therewith by the charging control timer 7. The flash boiler is provided with the usual pressure relief valve 214, as shown. As intimated hereinabove, it may be desirable to use a gaseous heating agent other than steam, the usual agent chosen being air. When air is to be used, the needle valve 210 is closed, and valve 216 of air supply line 215 is opened. Usually the air supply line will be provided with appropriate solenoid controls which duplicate the function of valve 208 and its solenoid control 209.

The special control of the steam injector system by the cull remover will now be described. As noted hereinabove, the cull remover is reciprocated to its cull ejecting position when the injector ram is fully retracted and safety switch 6 of the charging control circuit is closed. With the closing of the safety switch, the charging timer 7 is actuated, cutting in auger feed motor 124. Simultaneously, steam valve 212 is opened, and steam is injected into the injection chamber, scattering the powdered mold powder as it is fed in. When the timer 7 cuts out the auger, the solenoid 213 is deenergized, and valve 212 is closed. By this time, the cull remover block has started on its return, and the dog 110 closes overriding switch 111 momentarily, whereby solenoid 209 is energized, and valve 208 is opened, permitting a predetermined charge of water to be injected into the flash boiler, wherein it is instantly converted to steam. As the dwell of the switch 111 in its closed position is but a moment, the valve 208 is instantly closed, and the boiler 205 remains charged with steam, under pressure, which is discharged when the cycle timer again activates the control circuit.

The special switch control is comprised of an overriding switch 111, having a fixed contact 112 and a movable contact 113. The contact 113 is spring-biased, and is mounted on the end of a pivoted switch arm 114, pivoted at 115. A second, insulated switch arm 116 is also pivoted at 115 and forms a continuation of arm 114. The arm 114 is spring-biased on pivot 115 to the normally open-switch position shown in Fig. 12. The upper, insulated switch arm 116 is normally retracted by tension spring 117. When desired, the dwell of the switch can be varied by an adjustable contact member 118 mounted in the top of switch arm 116, which member is engaged by dog 110 in its reciprocating travel. When the cull ejector block is traversed to the left (Fig. 12), the switch arm 116 yields when engaged by the dog 110. On the return stroke (to the right, as shown in Fig. 12) the dog 110 urges switch arm 116, against the bias of tension spring 117, to move switch arm 114 to appose spring contact 113 to fixed contact 112 and close the circuit through leads 191a, 192a, which are severally connected to pivot 115 of switch arm 114, and to the fixed contact 112. As seen in Fig. 12, leads 191a and 192a are connected across the main current leads 191, 192.

Thermoplastic feeder

The thermoplastic molding material feeder assembly is comprised of the feeder proper, including a jacketed screw feeder casing and supply hopper; a cull remover slide-controlled gate valve; and a driving motor connected to the feeder screw through a variable pressure-responsive coupling means, comprising a wobbler pump, or the like.

The thermoplastic feeder proper, designated generally by the numeral 150, comprises a jacketed casing 151 having a necked-in discharge nozzle 152, and material supply means including hopper 153, feed pipe 154, and control valve 155 in the feed pipe. The outlet end of nozzle 152 is in threaded engagement with the threaded boss 57 of the injector casing 50, which opens into injection chamber 51. The casing 151 is mounted in and supported by end plate 92 of the cull remover casing 90. A butterfly control valve 156 is mounted in the nozzle 152, being fixedly secured in place and rotatable with valve stem 157 which extends out through the top of the nozzle. An extruder screw 158 is mounted in casing 151, and is integral with a shaft 159, driven from gear box 160, which, in turn is driven by motor 161 through "A" and "B" units 162, 163 of a variable pressure-responsive connector, such as a wobbler pump. Units 162, 163 are interconnected by fluid couplings 164 and 165, the latter coupling being by-passed to control valve 166 of unit 162 through line 167. The motor 161 is detachably coupled to "A" unit 162 by a clutch 168.

As noted hereinbefore, the casing 151 is supported upon and by the transverse support 80 and end plate 92. Spaced channels 170, 171 are secured in standard 15, and are extended laterally therefrom to provide a support for base 169 of the motor-wobbler pump assembly. Members 170, 171 are provided with supporting legs 172, as shown.

Figure 9:
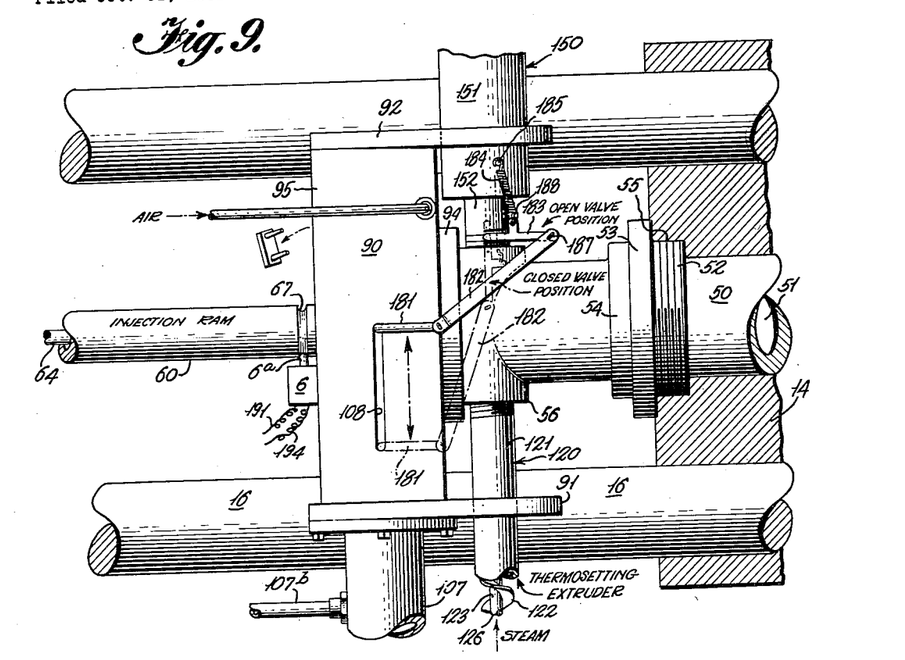
Fig. 9 is a fragmentary plan view of the cull remover casing and associated parts.
Figure 10:
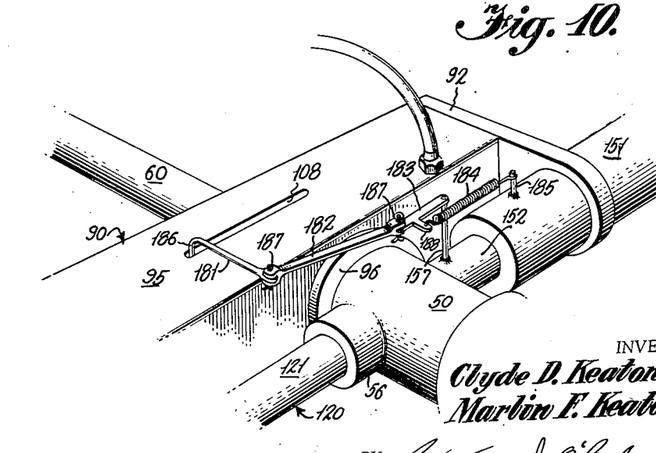
Fig. 10 is an elevation of the front side of the cull remover casing showing the details of the gate valve control of the thermoplastic feeder.

The butterfly valve 156 is controlled in the following manner: A control linkage 180 is comprised of a lever arm 181, link arm 182, rocker arm 183, biasing spring 184, and post 185. The lever arm 181 is provided with a threaded angular extension 186 which is in threaded engagement with the cull remover slide 100, and reciprocable in slot 108 of the cull remover casing. Link arm 182 is secured to lever arm 181 and to rocker arm 183 by means of cotter pins 187. Rocker arm 183 is fixed to spindle 157, and is provided with a lateral extension 188, which is coupled to post 185 by the tension spring 184, the post 185 being welded to feeder casing 151, or otherwise secured thereto in any suitable manner. As shown in Figs. 9 and 10, when the cull ejector is in cull-ejecting position, lever arm 181 is advanced to the limit of its travel in slot 108, and rocker arm 183 is rotated on and with its pivot 157, turning valve 156 to the open position, whereby plastic material is discharged through the nozzle 152 into injection chamber 51. When the slide is fully retracted to injection ram-journaling position, as shown in Fig. 10, the rocker arm 183 is rotated, against the bias of spring 184, and valve 156 is closed. The auger 158 is continuously operated, and, when valve 156 is closed a considerable pressure may be built up in the feeder. Compensator 160 is actuated according to the amount of pressure built up, and, in turn, actuates the variable pressure pump connector to reduce the power applied to the feeder screw, or to stop it altogether.

Mold piece ejector

It will be seen that the repeat switch of the ejector mechanism plays a key role in the automatic operation of the molding machine. This member is designated by the numeral 2, and its mounting will be described in connection with the orientation of the ejector.

The mold piece ejector 30, comprises a cylindrical casing 31 having top and bottom flanges 32, 33, severally secured to a cylinder head 34 and base plate 35, by tie rods 36. The piston rod mounts an ejector head 37 carrying a guiding rod 38 which is reciprocable in plate 35. The ejector head also carries a switch-actuating arm 39 which serves to close repeat switch 2 when the ejector piston rod is fully retracted in its up position. The switch is provided with usual current leads 201. The ejector is mounted on a suitable bracket at the top of the face of clamping base 14, and in alignment with the mold piece when die member 21 is retracted by the clamping ram. The ejector piston rod is reciprocably controlled by ejector valve 40. This member is a cylindrical casing having a base plate 41 secured to the top of clamping base 14 by machine screws 42. Valve 40 is provided with main inlet and outlet connections 131d, 132d, respectively in fluid communication with the hydraulic fluid pressure pump of the machine. Lines 43, 44 provide for the selective supply and return of the pressure fluid to and from opposite sides of the piston of ejector 30. The valve rod or stem of control valve 40 is indicated schematically at 45 in Fig. 11, and is controlled by solenoid 40a.

Automatic controls

The reciprocating parts of the machine, as indicated above, are operable in timed sequence by automatic controls severally associated therewith. Thus the closing of the clamping ram actuates a limit switch controlling the curing cycle timer. This timer controls the injection ram valve, and the injection ram in its retracted position closes a charging timer which simultaneously actuates a plastic feeder and the cull remover control valve. When the charging timer has completed its cycle, the thermo-setting plastic feeder auger motor is cut out of the circuit, and the cull remover is retracted. The curing cycle timer now returns the clamping ram valve to the open position, and a delayed action switch is operated by the clamping ram upon its retraction. The ejector valve is thereby actuated to cause the ejector to be lowered into mold piece ejecting position, and open the repeat switch controlling the recycle operations. When the ejector reaches the limit of its throw, the delayed action switch cuts out, restoring the ejector control valve to retracted piston position, where the repeat switch is closed, and the operative cycle is repeated.

The control circuits are shown schematically in Fig. 11 as follows:

A current source, not shown, is connected to leads 191, 192, the lead 191 having a main cut-out switch 193 incorporated therein. Motor 161 is cut across the power lines by leads 195, 196, as shown. Lead 191 has a terminal connection to charging timer switch 6, which is normally spring-biased into closed position, and functions as a safety interlock for the feeding and injection mechanisms. Switch 6 is connected to starter 197 by lead 194, charging timer 7 being incorporated in the lead. Starter 197, which is desirably of the magnetic type, is connected to return line 192, the latter being provided with a cut-out switch 8, as shown. This switch is coupled to clutch 168 to selectively actuate the thermosetting and thermoplastic feeders. Shunted across switch 8 and magnetic starter 197 by leads 198, 199 is a solenoid 200, the solenoid being adapted to control the cull remover valve which actuates the cull remover slide 100. Feeder line 201 is connected to clamping ram control solenoid 13c through repeat switch 2 and curing cycle timer 3 and shunt return 202. The injection ram valve control solenoid 70a is connected across the current mains through shunt line 203, with interposed limit switch 4 and curing cycle timer 3, and return line 202a. The ejector valve control solenoid 40a is connected across leads 203, 202 by line 204. This line incorporates delayed action switch 5, which, as shown, is normally biased to open position, and is closed by the clamping ram on its return to mold open position.

The control circuits will be seen to be divided into two parallel circuits: (1) combination feeder control, cull remover control with safety switch interlock therebetween, and steam injector control; and (2) combination, series-actuated, clamping ram, injection ram, and mold piece ejection ram controls.

Associated with the control circuits and selectively controlled thereby is the hydraulic fluid pressure system and its branches. These elements are comprised as follows: A main hydraulic pump 130 is coupled to and driven by the main motor 161 when starter switch 193 is closed. The pump is provided with a discharge line or header 131, and an inlet line 132 connected to a sump, not shown. Suitable by-pass connections may be established across lines 131, 132. Line 131 supplies pressure fluid to the cull remover valve, clamping ram valve, injection ram valve, through branch lines 131a, 131b, 131c, and 131d, respectively, return to line 132 being made through branch lines 132a, 132b, 132c, and 132d, respectively. While the molding machine is in operation, pump 130 is continuously operated, so that the hydraulic valves are always supplied with pressure fluid. It will be seen that the main or starter switch 193 controls both the electric and hydraulic circuits, whose interaction and interlocking controls will now be described.

Considering the feeder side of the system as involved in the handling of thermosetting plastic material, it will be noted that with the feeder hopper 120 charged with molding powder, and the injector chamber 51 empty, actuation of charging timer 7 will close the magnetic starter 197, switch 8 being closed, and will close the shunt circuit through solenoid 200. The auger motor 124 is energized, as is the cull remover valve, whereby molding powder and steam are delivered into the injection chamber simultaneously with the translation of the cull remover slide to its advanced, cull-discharging position. When the charging timer cuts out at the end of its predetermined charging period, the auger motor is stopped, and solenoid 200 is deenergized. Feeding of molding powder is thereby stopped, and the cull remover slide is retracted to its injection ram-journaling position.

Turning now to the molding side of the system, it will be noted that the clamping ram is in fully retracted position; the ejector ram has ejected the mold piece, and, returning to its retracted position, has closed repeat switch 2, thereby starting the curing cycle timer 3, connecting it to solenoid 13c controlling the clamping ram valve. The valve directs pressure fluid into the rear piston chamber of the ram, forcing the latter into its mold clamping position, where it closes limit switch 4. The timer 3 by this time has cut in the injection ram solenoid, which actuates the ram valve to introduce pressure fluid behind the ram piston 61, forcing the latter forward through the injection chamber where it engages and moves the molding powder through the nozzle 22 into the molding die. As the injector ram starts its forward movement out of groove 67, switch control 6a is unseated, thereby opening safety control switch 6. This action prevents the energizing of the feeder, steam injecting, and cull remover mechanisms while the injection mechanism is operating, so that switch 6 is to be considered as a positive safety interlock for the system. The molding die is heated, and under the conjoint effects of the heat and the injection ram pressure the mold material is consolidated and cured. The timer 3 cuts out solenoid 70a after a predetermined dwell of the injection ram in its forward position, and the ram valve is reversed to introduce pressure fluid into the front end of the injection ram piston chamber, effecting retraction of the injection ram to its retracted position.

When the injection ram has reached its retracted position the timer 3 has deenergized solenoid 13c, whereby the clamping ram valve is actuated to effect the return of the clamping ram and opening of the mold chamber. As it returns, the clamping ram engages and closes the normally open delayed action switch 5, which cuts in and energizes solenoid 40a controlling the ejector valve 40. This valve directs the pressure fluid behind the ejector ram forcing it into contact with the mold piece, unseating the same. The special character of this switch causes it to cut out at the end of the ejector stroke, whereby the ejector is immediately returned to its retracted position, engaging and closing repeat switch 2, reenergizing the curing cycle timer. As the injection ram is fully retracted, the safety switch 6 is released, energizing charging timer 7, and the simultaneous charging and cull-removing cycles are repeated.

The molding of thermoplastic material is carried out in the same manner as that of the thermosetting material, with the exception that the feed into the injection chamber is controlled by the cull remover-actuated butterfly valve, and the auger motor 124 is cut out of the circuit by switch 8. As already noted, when the thermoplastic side of the system is to be operated, clutch 168 is thrown in, connecting pump 162 to motor 161, and simultaneously opening switch 8. Under these conditions the charging timer now controls only the reciprocation of the cull remover slide, which is coupled to and controls the opening and shutting of the butterfly valve of the thermoplastic feeder. This feeder, as is evident from the description and drawings, is constantly working, excess pressures developing during the closed valve periods being relieved by the special pump and compensating unit driving the feeder auger, all as described hereinabove.

The novel universal injection molding machine of the present invention is also adapted for use as a plunger injection machine wherein the molding material is fed directly into the injection chamber from a suitable supply hopper, or the like. The operating mechanism will function as usual, the charge being forced into the die, and the controls described above and illustrated in Fig. 11, are used in the same manner, with the cull remover following its normal operational cycle, even though no sprues are formed, and the injection ram has no cull-keying undercuts on its plunger face.

The novel molding apparatus herein will be provided with the usual heating and cooling equipment, where necessary; and such equipment has not been described in detail as no invention is predicated upon the use of standard operational features, per se. However, and by way of contrast, it is believed that applicants use of steam in the injection chamber, following the introduction of the charge of powdered thermosetting material, has an important bearing on the injection molding operation and the speeding up of the time cycle. It is believed that the charge of powder in the injection chamber is first scattered by the injected gaseous fluid, thereby exposing the discrete particles to a maximum of heat along the entire length of the chamber. With the advance of the injection ram, the heated powder is gathered or consolidated, being finally injected through the nozzle into the die. The normal moisture content of the molding powder apparently does not suffice to effect the most rapid heating of the particles to the incipient plastic stage in the injection chamber. By the improved method steps herein, and particularly by the injection of heated gases, such as steam, into the charged injection chamber, the powdered charge is heated most quickly by using the latent heat of the gases as well as the direct conductive heat from the injection chamber wall. The marked reduction in the molding cycle time effected by the practice of the present invention is considered to be due, in no small part, to the efficiency of the charge heating, as set forth hereinabove.

It will now be appreciated that there has been provided a novel universal molding apparatus for injection molding of both thermosetting and thermoplastic materials, as well as a novel method of handling plastic charges in an injection chamber. The novel apparatus is characterized by improved operational features stemming from the special formation, removal and ejection of sprues and attached culls, and these steps are tied in, by automatic controls, with the sequential operations of charge feeding, mold injecting, mold opening, mold piece ejection, mold closing, and repetition of the cycle. The special formation and removal of sprues without requiring after treatment of mold pieces is an important feature of the invention herein, another feature being the use of the equipment associated with such operations to effect the automatic control of the sequence of cyclic steps involved.

It will also be appreciated that completely automatic operation of injection molding machines is made possible by the improvements of the present invention, including the continuous recycling of the operations, and without requiring operational inspections or manipulations other than the replenishment of the feed material in the feed hopper, and the random checking of mold pieces.

While we have shown and described the preferred embodiment of our invention, we wish it to be understood that we do not confine ourselves to the precise details of construction herein set forth by way of illustration, as it is apparent that many changes and variations may be made therein, by those skilled in the art, without departing from the spirit of the invention or exceeding the scope of the appended claims.

What we claim is:

1. An injection molding machine comprising a die assembly and clamping means therefor; an injector chamber and a piston-actuated injector ram reciprocable therein, said injector ram having a keying slot formed in its face; screw means for feeding a charge of molding material directly into said injector chamber; a nozzle discharging from said injector chamber into said die, said nozzle having at least one rearwardly tapering aperture, whereby when the charge is forced from the injector chamber into the die, a cull is formed and keyed to the face of the injector ram, the sprue portion of the cull tapering outwardly from the keyed portion and retractile therewith; a cull remover normally journaling the injector ram; means for traversing the cull remover across the end of the injector chamber when the injector ram is fully retracted; means in the cull remover for unseating the keyed cull when the remover is traversed; and means for ejecting unseated culls from the cull remover.

2. A universal molding machine for molding thermosetting and thermoplastic materials, comprising, in combination, a common injector assembly with a unitary die assembly, selectively operable thermosetting feeding means and a valved thermoplastic feeding means severally coupled to the injector assembly, and a common cull remover coupled to the injector assembly; said injector assembly comprising a common injector chamber and piston-actuated ram reciprocable therein, the ram having a keying slot in its face; the die assembly including a nozzle discharging from said injector chamber into said die, said nozzle having at least one rearwardly tapering aperture, whereby when a charge of molding material is forced from the injector chamber into the die, a cull is formed and keyed to the face of the injector ram, the sprue portion of the cull tapering outwardly from the keyed portion and retractile therewith; said cull remover normally journaling the injector ram, and being traversed across the end of the injector chamber when the injector ram is fully retracted, the cull remover incorporating means for unseating and ejecting the keyed cull when the remover is traversed, and also incorporating control means for the thermoplastic material feeder valve.

3. An injection molding machine particularly adapted for use with thermosetting plastics, comprising, in combination, an injection chamber discharging into a heated die chamber through a nozzle having rearwardly flaring orifices; a feeder mechanism feeding powdered molding material into the injection chamber; an injection ram having a keyway formed in its face and cooperating with the nozzle orifices to form a unitary keyed cull incorporating the sprues of the mold piece; a cull remover movable to translate a cull from the retracted injection ram to a cull discharge position, said cull remover incorporating a venting passage registering with the injection chamber in the cull discharge position; and means for introducing heated gaseous fluid into the injection chamber together with a measured quantity of powdered material, whereby the powder is preheated, said gaseous fluid venting through the venting passage.

4. An injection molding machine for thermosetting plastics, comprising, in combination, an injection chamber and a heated die chamber; an injector ram reciprocable in the injection chamber; a nozzle between the injection chamber and the heated die; means in the nozzle and the face of the injector ram effective to form a keyed cull incorporating the sprues of the mold piece, said cull being separable from the mold piece on retraction of the injector ram; feeder means discharging a charge of molding powder into the injection chamber together with a charge of heated gaseous fluid, whereby the particles of powder are individually preheated below the threshold reaction temperature; a cull remover movable to translate a cull from the retracted injection ram to a cull discharge position, said cull remover incorporating a venting passage registering with the injection chamber in the cull discharge position, whereby the gaseous fluid in the injection chamber is vented; and interlocking control means for the feeder, injector, die and cull remover, whereby the mold piece is ejected from the die, the cull remover is retracted, the cull is ejected, and the injection ram is actuated to force the gas-preheated molding powder into the heated die, wherein it is compressed and fused to form a mold piece and the sprues are keyed to the injection ram for retraction therewith as a unitary cull.

5. A combination cull remover and ejector for injection molding machines, comprising a casing disposed transversely of the feeder end of an injection chamber; a cull remover block mounted for reciprocation in the casing; means for reciprocating the block in the casing; registering apertures in the casing and the block in its fully retracted position, said apertures serving to journal the injection ram in its advanced, operating position, the block being locked in place by the ram; a third aperture in the casing registering with the aperture in the block when the block is in its fully advanced position; and air blast means in alignment with the third casing aperture, whereby when the cull remover block is in its advanced position, the cull asported thereby is blown out through said third casing aperture by the air blast.

6. A combination cull remover and ejector for injection molding machines, comprising a casing disposed transversely of the feeder end of an injection chamber; a cull remover block mounted for reciprocation in the casing; means for reciprocating the block in the casing; registering apertures in the casing and the block, in its fully retracted position, said apertures serving to journal the injection ram in its advanced, operating position, the block being locked in place by the ram; a third aperture in the casing registering with the aperture in the block when the block is in its fully advanced position; a second aperture in the block, on the injection chamber side, and registering with the injection chamber when the block is fully advanced; an axial passage connecting said block apertures; and air blast means in alignment with the third casing aperture, whereby when the cull remover block is in its advanced position, the cull asported thereby is blown out by the air blast through the third casing aperture.

7. In an injection molding machine for thermosetting plastics having a cull remover operatively associated with the injector ram, the improvements comprising a closed injection chamber, a feeder for molding powder including a hollow screw auger discharging into the injection chamber, said hollow auger serving as means for introducing a charge of steam into the injection chamber with a charge of molding powder, and means in the cull remover for venting the steam from the injection chamber.

8. In an injection molding machine for thermosetting plastics having a cull remover operatively associated with the injector ram, the improvements comprising a feeder for molding powder, means for introducing hot, non-reactive, gaseous fluid into the injection chamber with a charge of molding powder, whereby the particles of powder are individually preheated below the threshold reaction temperature, and means in the cull remover for venting the gaseous fluid from the injection chamber.

9. An injection molding machine comprising a die assembly and clamping means therefor; an injector chamber and a piston-actuated injector ram reciprocable therein, said injector ram having a keying slot formed in its face; valved means for feeding a predetermined charge of thermoplastic molding material into said injector chamber; a nozzle discharging from said injector chamber into said die, said nozzle having at least one rearwardly tapering aperture, whereby when the charge is forced from the injector chamber into the die, a cull is formed and keyed to the face of the injector ram, the sprue portion of the cull tapering outwardly from the keyed portion and retractile therewith; a cull remover normally journalling the injector ram; means for traversing the cull remover across the end of the injector chamber when the injector ram is fully retracted; means in the cull remover for unseating the keyed cull and opening the feeder valve when the remover is traversed; and means for ejecting unseated culls from the cull remover.

10. An injection molding machine for thermoplastic material, comprising, in combination, an injection chamber and a heated die chamber; an injector ram reciprocable in the injection chamber; a nozzle between the injection chamber and the heated die; means in the nozzle and the face of the injector ram effective to form a keyed cull incorporating the sprues of the mold piece, said cull being separable from the mold piece on retraction of the injector ram; valved feeder means discharging a charge of themoplastic molding material into the injection chamber; a cull remover movable to translate a cull from the retracted injection ram to a cull discharge position; interlocking control means for the cull remover, feeder, injector, and die, whereby with the feeder operating to charge the injection chamber, the cull remover is in cull-discharging position, and simultaneously holds the feeder valve open, locks the injection ram in its retracted position, and discharges the cull, while the sprue-free mold piece sets in the die, and, upon stopping of the feeder, the mold piece is ejected from the die, the cull remover is retracted, closing the feeder valve, the injection ram is actuated to force the molding material into the heated die, wherein it is compressed and fused to form a mold piece, and the sprues are keyed to the injector ram for retraction therewith as a unitary cull.

References Cited in the file of this patent

UNITED STATES PATENTS

| | | |
|---|---|---|
| 1,639,430 | Gammeter | Aug. 16, 1927 |
| 1,858,956 | Hepperle | May 17, 1932 |
| 1,934,855 | Humphrey | Nov. 14, 1933 |
| 1,960,992 | During et al. | May 29, 1934 |
| 1,988,506 | Pack | Jan. 22, 1935 |
| 2,253,810 | Poux | Aug. 26, 1941 |
| 2,271,063 | De Mattia | Jan. 27, 1942 |
| 2,336,212 | Baron et al. | Dec. 7, 1943 |
| 2,359,840 | Goessling | Oct. 10, 1944 |
| 2,418,856 | Stacy | Apr. 15, 1947 |
| 2,438,857 | Knowles | Mar. 30, 1948 |
| 2,482,338 | Hall | Sept. 20, 1949 |
| 2,487,426 | Cousino | Nov. 8, 1949 |
| 2,519,255 | Knowles | Aug. 15, 1950 |
| 2,523,137 | Nichols et al. | Sept. 19, 1950 |
| 2,594,956 | Marshall | Apr. 29, 1952 |

FOREIGN PATENTS

| | | |
|---|---|---|
| 629,228 | Great Britain | Sept. 15, 1949 |
| 901,731 | France | Nov. 13, 1944 |